(12) United States Patent
Lee

(10) Patent No.: US 6,526,057 B1
(45) Date of Patent: Feb. 25, 2003

(54) TERMINAL ADAPTER FOR BROADBAND INTEGRATED SERVICES DIGITAL NETWORK

(75) Inventor: Myung-Kyu Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/015,057

(22) Filed: Jan. 28, 1998

(30) Foreign Application Priority Data

Feb. 12, 1997 (KR) .............................. 97-4108

(51) Int. Cl.[7] ............................................. H04L 12/28
(52) U.S. Cl. ...................................................... 370/395
(58) Field of Search ................................ 370/395, 466, 370/465, 474, 394, 904, 399, 535, 538, 543, 236, 229; 364/240.8, 240.9

(56) References Cited

U.S. PATENT DOCUMENTS

| 5,303,344 | A | * | 4/1994 | Yokoyama et al. ......... 370/466 |
| 5,446,738 | A | * | 8/1995 | Kim et al. .................. 370/395 |
| 5,519,707 | A | * | 5/1996 | Subramanian et al. ...... 370/339 |
| 5,519,835 | A | * | 5/1996 | Nakagaki et al. ........ 364/240.8 |
| 5,678,060 | A | * | 10/1997 | Yokoyama et al. ......... 709/212 |
| 5,740,173 | A | * | 4/1998 | Fiorini ........................ 370/394 |
| 5,771,350 | A | * | 6/1998 | Kim ............................ 370/904 |
| 5,778,001 | A | * | 7/1998 | Nakayama et al. ......... 370/516 |
| 5,812,550 | A | * | 9/1998 | Sohn et al. .................. 370/395 |
| 5,862,136 | A | * | 1/1999 | Irwin .......................... 370/395 |
| 5,933,607 | A | * | 8/1999 | Tate et al. ................... 370/468 |
| 5,953,336 | A | * | 9/1999 | Moore et al. ............... 370/395 |
| 6,121,162 | A1 | * | 4/2001 | Horlin ......................... 370/229 |
| 6,236,655 | B1 | * | 5/2001 | Caldara et al. ............. 370/395 |

* cited by examiner

*Primary Examiner*—Kwang Bin Yao
*Assistant Examiner*—Prenell Jones
(74) *Attorney, Agent, or Firm*—Fleshner & Kim, LLP

(57) ABSTRACT

The present invention provides a terminal adapter for BISDN. The terminal that is applicable to both variable bit rate (VBR) ATM cells and constant bit rate (CBR) ATM cells for connecting a $S_B$ point to a R point. The terminal adapter can transfer and prioritize CBR and VBR ATM cells. The system uses a multiplexer/demultiplexer that is capable of determining an ATM cell type and capable of determining a priority of ATM cell types. The mumiplexer/demultiplexer determines priority among ATM cells and selects ATM cells among the both of VBR ATM cells and CBR ATM cells, and outputs the selected ATM cells to the said physical layer according to the determined priority when transmitting data from R point to $S_B$ point, or determines the type of ATM cell, and outputs VBR ATM cells to the ATM AAL3/4,5 layer, CBR ATM cells to one of the multiple CBR interfaces when transmitting data from $S_B$ point to R point.

26 Claims, 3 Drawing Sheets

TERMINAL ADAPTER FOR BROADBAND INTEGRATED SERVICES DIGITAL NETWORK

BACKGROUND OF THE INVENTION

1. Field of the Invention

The present invention relates to a terminal adapter for broad band integrated services digital network, and more particularly to a terminal adapter which is applicable to the both of variable bit rate ATM(Asynchronous Transfer Mode) cell and constant bit rate ATM cell.

In ISDN, all communication data is digitalized and transmitted and received via high speed single communication network. In prior communication system, separate communication network is necessary for each communication system such as telephone or computer etc. On the contrary, ISDN use a high speed single digital communication network for whole services.

BISDN is ISDN which is extended to broad band signal based on the technique of the ISDN. In BISDN, both narrow band signal such as telephone, facsimile and internet service and broad band signal of video signal such as image conference and video telephone are included.

ATM is known as a effective mode by which the above variable services of BISDN are accomplished. In ATM, service information is transmitted by stream of a constant sized packet called ATM cell. The ATM cell is 53 bytes, which consist of 5 byte-cell header and 48 payload. ATM uses defined protocol standard to transmit service information systematically. In the defined protocol standard, the cell header is processed by ATM layer and the user information section by ATM adaptation Layer(AAL).

Terminal adapter for BISDN is apparatus which connects ATM network to a conventional communication devices such as modem, telephone or facsimile, more specifically connects $S_B$ point of ATM network to R point of the conventional communication devices.

2. Description of the Prior Art

FIG. 1 is a block diagram illustrating a terminal adapter for BISDN in the prior art.

Physical layer(10) converts ATM cell inputted to $S_B$ point in ATM network to bit stream. Then, ATM AAL3/4,5 layer(8) converts the bit stream to cell data of ATM and AAL3/4,5 format. The information of cell data such as ATM header, AAL type information, packet size etc. is stored in control memory(9), and packet data is stored in packet memory(7). Microprocessor(1) determines the type of data by the data stored in control memory(9), and outputs data stored in the packet memory(7) to LAN interface(5) or frame relay interface(6) according to the type of data. LAN interface(5) and frame relay interface(6) convert the received packet data to LAN data and frame relay data respectively, and transmit to R point.

Besides, microprocessor(1) control all the device and carry out the conversion of protocol. Memory(2) consists of ROM(Read Only Memory) and RAM(Random Access Memory). Device control circuit(3) comprises of device selection portion, and peripheral circuit(4) comprises of SIO(Serial Input Output), timer. Power supply(11) convert AC power to DC power which is necessary to the device.

The terminal adapter for BISDN according to the above prior art described in FIG. 1 is not applicable to various type of ATM cell. In connecting $S_B$ point to R point, it is applicable to only variable bit rate ATM cell, and not applicable to constant bit rate ATM cell.

Hence, there is a need for enhanced terminal adapter for BISDN which is applicable to the both of variable bit rate ATM cell and constant bit rate ATM cell for connecting $S_B$ point to R point.

SUMMARY OF THE INVENTION

Therefore, an object of the present invention is to provide a terminal adapter, which is applicable to the both of variable bit rate ATM cell and constant bit rate ATM cell for connecting $S_B$ point to R point.

In order to accomplish this object, the present invention provides a terminal adapter for BISDN comprising: ATM AAL3/4,5 layer converting a variable bit rate data to ATM cell; a plurality of constant bit rate interfaces converting a constant bit rate data to ATM cell respectively; physical layer converting physical layer data to ATM cell; and multiplexer/demultiplexer which determines priority and selects ATM cell among the both of variable bit rate ATM cell and constant bit rate ATM cell and outputs the selected ATM cells to the said physical layer according to the determined priority in case of transmitting data from R point to $S_B$ point, or determines the type of ATM cell and output variable bit rate ATM cell to the said ATM AAL3/4,5 layer, constant bit rate ATM cell to one of the said plurality of constant bit rate interfaces in case of transmitting data from $S_B$ point to R point.

In case of transmitting data from R point to $S_B$ point, the said multiplexer/demultiplexer according to the present invention operates as multiplexer. On the contrary, in case of transmitting data from $S_B$ point to R point, it operates as demultiplexer.

The said multiplexer/demultiplexer of terminal adapter according to the present invention comprises UTOPIA (Universal Test & Operation Physical Layer Interface for ATM) interface connecting the said multiplexer/demultiplexer to the said physical layer; the first FIFO receiving VBR cell from the said ATM AAL3/4,5 layer; VBR controller receiving VBR control signal from the said ATM AAL3/4,5 layer and controlling output of VBR cell from the said the first FIFO; the second FIFO(First In First Out) receiving CBR cell from the said constant bit rate interfaces; CBR controller receiving CBR control signals from the said constant bit rate interfaces and controlling output of CBR cell from the said the second FIFO; transmission priority determining block determining the transmission priority between CBR cell and VBR cell; and UTOPIA transmission controller transmitting CBR cell or VBR cell to UTOPIA interface in due sequence determined by the said transmission priority determining block.

The said multiplexer/demultiplexer of terminal adapter according to the present invention also comprises UTOPIA reception controller receiving ATM cell from the physical layer in case of transmitting date from $S_B$ point to R point; header storage resister storing VPI(Virtual Path Identifier) value and VCI(Virtual Channel Identifier) value of the received ATM cell; and cell transmission controller determining the type of ATM cell by the value stored in the header storage register and transmitting CBR cell to one of the said constant bit rate interfaces, VBR cell to the ATM AAL3/4,5 layer.

BRIEF DESCRIPTION OF THE DRAWINGS

Other objects and aspects of the present invention will become apparent from the following description of embodiments with reference to the accompanying drawings in which.

DESCRIPTION OF THE PREFERRED EMBODIMENTS

Figure 1:
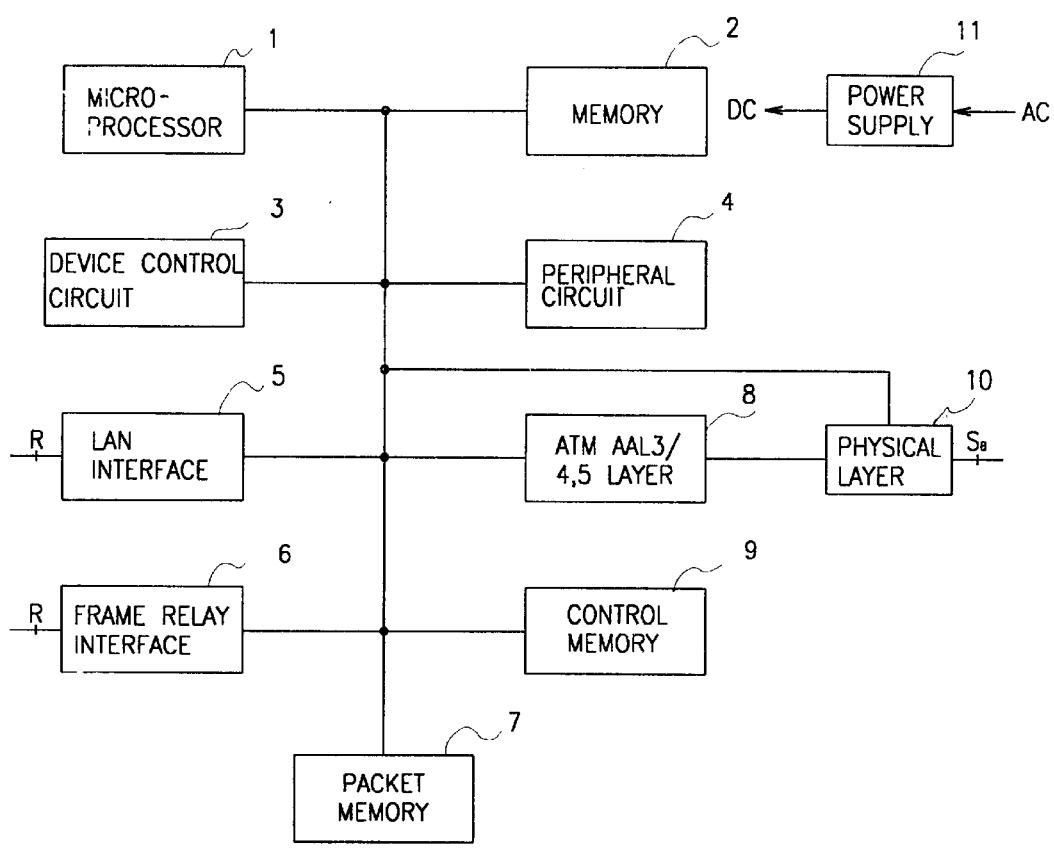
FIG. 1 is a block diagram illustrating a terminal adapter according to the prior art.
Figure 2:
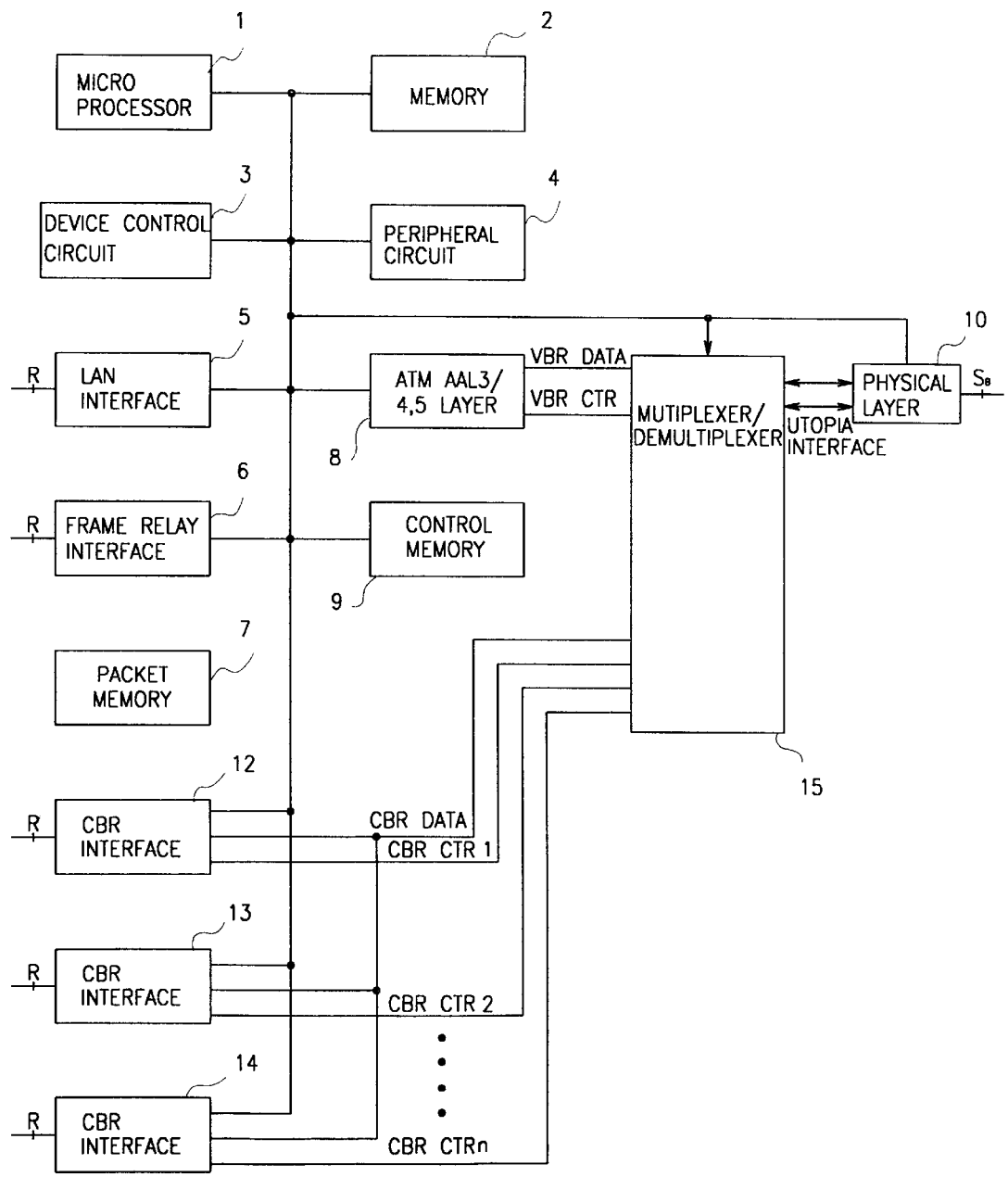
FIG. 2 is a block diagram illustrating a terminal adapter according to the present invention.

Referring to FIG. 2, a terminal adapter in accordance with an embodiment of the present invention is illustrated. As shown in FIG. 2, the terminal adapter comprises microprocessor(1), memory(2), peripheral circuit(4), LAN interface(5), frame relay interface(6), packet memory(7), ATM AAL3/4,5 layer(8), control memory(9), physical layer (10), constant bit rate interfaces(12,13,14) for processing constant bit rate data, and multiplexer/demultiplexer (15).

Constant bit rate interfaces(12,13,14) converts constant bit rate data to AAL format and ATM cell format having VPI(Virtual Path Identifier) value and VCI(Virtual Channel Identifier) value.

Multiplexer/demultiplexer(15) is connected to physical layer(10). In case of transmitting data from $S_B$ point to R point, the multiplexer/demultiplexer(15) operates as demultiplexer. That is, multiplexer/demultiplexer(15) determines whether the type of ATM cell received from physical layer (10) is constant bit rate ATM cell or variable bit rate ATM cell, and then select an output path corresponding to the received ATM cell. On the contrary, in case of transmitting data from R point to $S_B$ point, the multiplexer/demultiplexer (15) operates as multiplexer. That is, multiplexer/demultiplexer(15) receives both variable bit rate ATM cell and constant bit rate ATM cell and outputs one of the ATM cell to the physical layer(10).

Figure 3:
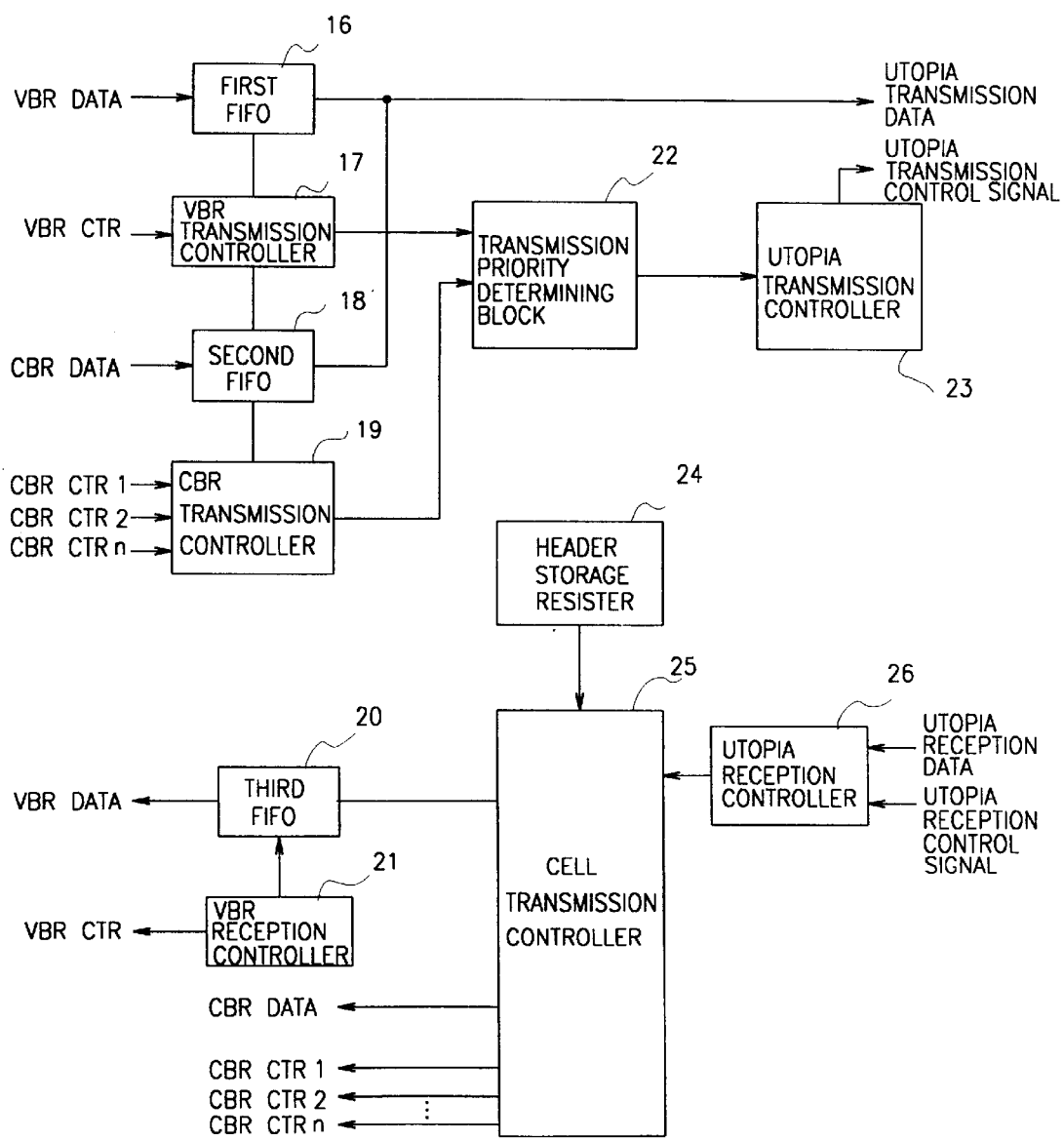
FIG. 3 is a detailed block diagram illustrating the multiplexer/demultiplexer of the terminal according to the present invention.

Referring to FIG. 3, the multiplexer/demultiplexer of the terminal adapter described in FIG. 2 is illustrated. As shown in FIG. 3, the multiplexer/demultiplexer comprises UTOPIA interface (23), the first FIFO(16), VBR transmission controller(17), the second FIFO(18), CBR transmission controller(19), and transmission priority determining block (22) for transmitting data from R point to $S_B$ point.

As shown in the FIG. 3, the multiplexer/demultiplexer comprises also, UTOPIA reception controller(26), header storage register(24) and cell transmission controller(25) for transmitting data from $S_B$ point to R point.

Hereafter, operation of the terminal adapter illustrated in FIG. 2 and FIG. 3 according to an embodiment of the present invention will be described.

Firstly, transmission data from R point to $S_B$ point is described.

Constant bit rate interfaces(12,13,14) converts their constant bit rate data to AAL format and ATM cell format respectively. Converted CBR cell is inputted to the second FIFO(18). CBR transmission controller(19) receives a plurality of CBR cell control signals and allow only one of CBR cell transmitted via cell bus.

Variable bit rate data such as, LAN and frame relay etc, is converted to ATM cell by ATM AAL3/4,5 relay(8), and outputted to the first FIFO(16). VBR control signal from ATM AAL3/4,5 relay(8) is outputted to the VBR transmission controller(17).

Transmission priority determining block(22) determines the transmission priority between CBR cell and VBR cell. Normally, CBR cell has transmission priority over VBR cell. UTOPIA transmission controller (23) transmit VBR cell in the first FIFO(16) or CBR cell in the second FIFO(18) to the physical layer(10) via UTOPIA interface in accordance the transmission priority determined by the transmission priority determining block(22). Then, ATM cell is transmitted to $S_B$ point.

Secondly, transmission of data from $S_B$ point to R point is described.

ATM cell inputted from $S_B$ point of ATM network is converted to bit stream in the physical layer(10). UTOPIA reception controller(26) controls reception timing of the bit stream from the physical layer(10). VPI value and VCI value of the received ATM cell is stored in a header storage register(24) under control of microprocessor(1). Cell transmission controller(25) determines the type of ATM cell, that is cell transmission controller(25) determines whether the type of the received ATM cell is constant bit rate ATM cell or variable bit rate ATM cell by the VPI value and VCI value stored in the header storage register(24). Then it transmits constant bit rate ATM cell to one of the said constant bit rate interfaces according to the VCI value and VPI value, variable bit rate ATM to the third FIFO(20).

ATM cell stored in the third FIFO(20) is transmitted to ATM AAL3/4,5 layer(8) under the control of VBR reception controller(21). ATM AAL3/4,5 layer(8) converts the received ATM cell to cell data. ATM header, AAL type, packet size of the converted cell data is stored in control a memory(9) and packet data is stored in a packet memory(7). microprocessor(1) determines whether the packet data stored in the packet memory(7) is LAN data or frame relay data, and then controls the transmission of the packet data to LAN interface(5) or frame relay interface(6). LAN interface (5) or frame relay interface(6) converts the received data to LAN data or frame relay data respectively, transmit it to R point.

Meanwhile, each constant bit rate interface(12,13,14) transmit the corresponding CBR data to R point.

As apparent from the above description, the present invention provides a terminal adapter for BISDN by which both of variable bit rate data and constant bit rate data can be transmitted and received between $S_B$ point and R point. Also, the terminal adapter according to the present invention can determine the priority of transmission between variable bit rate data and constant bit rate data.

What is claimed is:

1. A terminal adapter for BISDN, comprising:
    an ATM AAL3/4, 5 layer to convert variable bit rate (VBR) data to an ATM cell;
    a plurality of constant bit rate (CBR) interfaces, each one to convert CBR data to an ATM cell;
    a physical layer to convert physical layer data to ATM cells; and
    a multiplexer/demultiplexer, which receives CBR ATM cells and VBR ATM cells, and performs one of a multiplexing and demultiplexing operation, wherein when transmitting data from R point to $S_B$ point the multiplexer/demultiplexer determines a priority of the received ATM cells based on the type of bit rate of the received ATM cells, and selects and outputs the received ATM cells to the physical layer according to the determined priority, and when transmitting data from $S_B$ point to R point, determines the type of ATM cell and outputs VBR ATM cells to the ATM AAL3/4, 5 layer and CBR ATM cells to one of the plurality of CBR interfaces.

2. The terminal adapter in accordance with claim 1, wherein if transmitting data from R point to $S_B$ point, the multiplexer/demultiplexer operates as a multiplexer, and if transmitting data from $S_B$ point to R point, said multiplexer/demultiplexer operates as a demultiplexer.

3. The terminal adapter in accordance with claim 1, wherein the multiplexer/demultiplexer comprises:
   a Universal Test & Operation Physical Layer Interface ATM (UTOPIA) interface to connect the multiplexer/demultiplexer to the physical layer;
   a first First In First Out EIFO) coupled to receive VBR cells from the ATM AAL3/4,5 layer;
   a VBR transmission controller coupled to receive VBR control signals from the ATM AAL3/4,5 layer and to control an output of VBR cells from the first FIFO;
   a second FIFO coupled to receive CBR cells from the CBR interfaces;
   a CBR transmission controller coupled to receive CBR control signals from the CBR interfaces and controlling an output of CBR cells from the second FIFO;
   a transmission priority determining block to determine the transmission priority between CBR cells and VBR cells; and
   a UTOPIA transmission controller to transmit CBR cells or VBR cells to the UTOPIA interface in a sequence determined by the transmission priority determining block.

4. The terminal adapter in accordance with claim 3, wherein the multiplexer/demultiplexer further comprises:
   a UTOPIA reception controller receiving ATM cells from the physical layer;
   a header storage register storing a Virtual Path Identifier (VPI) value and a Virtual Channel Identifier (VCI) value of the received ATM cell; and
   a cell transmission controller determining the type of ATM cell by the value stored in the header storage register and transmitting CBR cells to one of the CBR interfaces and VBR cells to the ATM AAL3/4,5 layer.

5. A terminal adapter for BISDN, comprising:
   an ATM AAL3/4,5 layer converting a variable bit data to ATM cell;
   a plurality of constant bit rate interfaces converting a constant bit rate to ATM cell, respectively;
   a physical layer converting physical layer data to ATM cell; and
   a multiplexer/demultiplexer which determines a transmission priority and selects ATM cell among both of variable bit rate ATM cell and constant bit rate ATM cell and outputs said selected ATM cell to said physical layer according to said determined priority, or determines a type of ATM cell from said physical layer and outputs variable bit rate ATM cell to said ATM AAL3/4,5 layer, wherein said multiplexer comprises,
      a first FIFO buffer storing VBR cell from said ATM AAL3/4,5 layer,
      a second FIFO buffer storing CBR cell from one of a plurality of CBR interfaces,
      a VBR transmission controller receiving a VBR control signal and controlling an output of VBR cells from said first FIFO buffer and outputting a VBR priority signal,
      a CBR transmission controller receiving CBR control signals and controlling an output of CBR cells from said second FIFO buffer and outputting a CBR priority signal,
      a transmission priority determining block determining said transmission priority between CBR cell and VBR cell according to said VBR priority signal and said CBR priority signal, and
      a UTOPIA transmission controller transmitting CBR cell or VBR cell to UTOPIA interface in due sequence determined by said transmission priority determining block; and wherein said demultiplexer comprises,
      a UTOPIA reception controller receiving ATM cell from said physical layer,
      a header storage register storing predetermined Virtual Path Identifier (VPI) value and Virtual Channel Identifier (VCI) value, and
      a cell transmission controller determining a type of ATM cell by comparing a value stored in said header storage register to VPI and VCI value of said received ATM cell and transmitting CBR cell to one of said CBR interfaces or VBR cell to said ATM AAL3/4,5 layer.

6. A multiplexer for a B-ISDN terminal adapter, comprising:
   a first input circuit, which receives first and second traffic type ATM cells from interface units;
   a transmission priority determining unit, which determines a transmission priority between the received first and second traffic type ATM cells based on the traffic type, and outputs the first and second traffic type ATM cells in priority order to a physical layer;
   a second input circuit, which receives first and second traffic type ATM cells from the physical layer;
   a cell transmission controller, which determines the type of ATM cell from among the first and second type, and outputs first traffic type ATM cells to a first traffic type interface unit and outputs second traffic type ATM cells to a second traffic type interface unit, wherein the cell transmission controller comprises a cell transmission control circuit and a header storage register, and wherein the header storage register stores Virtual Path Identifier (VPI) and Virtual Channel Identifier (VCI) information of a plurality of ATM cells, and wherein the cell transmission control circuit determines the type of ATM cells based on the VPI value and VCI value and outputs the ATM cell to a one of an ATM AAL3/4, 5 layer and a CBR interface according to the type of ATM cell.

7. The multiplexer of claim 6, wherein the first traffic type ATM cells comprise variable bit rate (VBR) ATM cells, and the second traffic type ATM cells comprise constant bit rate (CBR) ATM cells.

8. The multiplexer of claim 7, wherein the first traffic type interface unit comprises an ATM AAL3/4,5 layer and the second traffic type interface unit comprises a CBR interface unit.

9. The multiplexer of claim 6, wherein the cell transmission controller further comprises a FIFO circuit to receive and output first traffic type data from the cell transmission control circuit, and a first traffic type reception controller to control the output of the first traffic type data from the FIFO circuit.

10. The multiplexer of claim 9, wherein the first traffic type is VBR.

11. The multiplexer of claim 6, wherein the cell transmission control circuit directly outputs second traffic type data and a plurality of second traffic type control signals.

12. The multiplexer of claim 11, wherein the second traffic type is CBR.

13. The multiplexer of claim 6, wherein the transmission priority determining unit comprises a transmission priority determining circuit, which receives first and second traffic type control signals and determines the transmission priority.

14. The multiplexer of claim 13, wherein the transmission priority determining unit further comprises a Universal Test & Operation Physical Layer Interface for ATM (UTOPIA) transmission controller, which transmits the first and second traffic type ATM cells to the physical layer.

15. The multiplexer of claim 14, wherein the first input circuit comprises a first FIFO, which receives and stores first traffic type data, a second FIFO which receives and stores second traffic type data, and first and second traffic type transmission controllers, which control the transmission of the data from the first and second FIFOs, respectively.

16. The multiplexer of claim 15, wherein the first traffic type is VBR and the second traffic type is CBR.

17. The multiplexer of claim 6, wherein the second input circuit comprises a Universal Test & Operation Physical Layer Interface for ATM (UTOPIA) reception controller, which receives ATM cells from the physical layer.

18. The adapter of claim 1, wherein CBR ATM cells have the priority over VBR ATM cells.

19. The adapter of claim 1, wherein the multiplexer comprises a cell transmission control circuit and a header storage register, wherein the header storage register stores Virtual Path Identifier (VPI) and Virtual Channel Identifier (VCI) information, and wherein the cell transmission control circuit determines the type of ATM cells based on the VPI value and VCI value.

20. The multiplexer of claim 6, wherein the first traffic type ATM cells have transmission priority over the second traffic type ATM cells.

21. A multiplexer/demultiplexer for a communication system, comprising:
a header storage register to store Virtual Path Identifier (VPI) and Virtual Channel Identifier (VCI) information of a plurality of ATM cells; and
a cell transmission control circuit to determine a type of ATM cells based on the VPI value and VCI value and output the ATM cell to a one of an ATM AAL3/4, 5 layer and a CBR interface according to the type of ATM cell.

22. The multiplexer/demultiplexer of claim 21, further comprising a transmission priority determination circuit to determine a transmission of received data bits, wherein the data bits are one of variable bit rate (VBR) data and constant bit rate (CBR) data.

23. The multiplexer/demultiplexer of claim 21, wherein the multiplexer/demultiplexer receives at least one of CBR ATM cells and VBR ATM cells and performs one of a multiplexing and demultiplexing operation, wherein when transmitting data from R point to $S_B$ point the multiplexer/demultiplexer determines a priority of the received ATM cells based on the type of bit rate of the received ATM cells, and selects and outputs the received ATM cells to the physical layer according to the determined priority, and when transmitting data from $S_B$ point to R point, determines the type of ATM cell from among CBR and VBR and outputs VBR ATM cells to the ATM AAL3/4, 5 layer and CBR ATM cells to the CBR interface.

24. The multiplexer of claim 6, wherein the cell transmission controller outputs the ATM cell to a one of an ATM AAL3/4, 5 layer and a CBR interface according to the type of ATM cell.

25. The multiplexer of claim 6, further comprising a transmission priority determination circuit to determine a transmission of received data bits, wherein the data bits are one of variable bit rate (VBR) data and constant bit rate (CBR) data.

26. The multiplexer of claim 6, wherein the multiplexer receives at least one of CBR ATM cells and VBR ATM cells and performs a multiplexing operation, wherein when transmitting data from R point to $S_B$ point the multiplexer determines a priority of the received ATM cells based on the type of bit rate of the received ATM cells, and selects and outputs the received ATM cells to the physical layer according to the determined priority, and when transmitting data from $S_B$ point to R point, determines the type of ATM cell from among CBR and VBR and outputs VBR ATM cells to the ATM AAL3/4, 5 layer and CBR ATM cells to the CBR interface.

* * * * *